July 4, 1933.                A. L. BEACH                1,916,552
                           CONVEYER SYSTEM
                        Filed Sept. 20, 1929          3 Sheets-Sheet 1
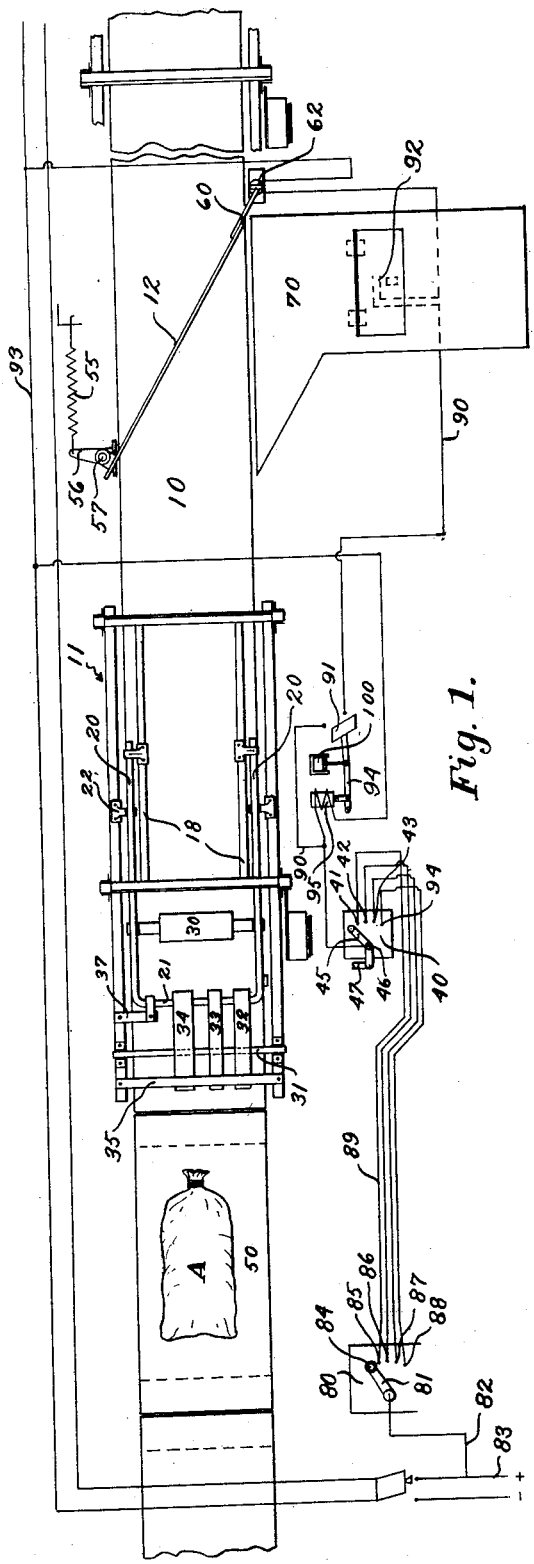
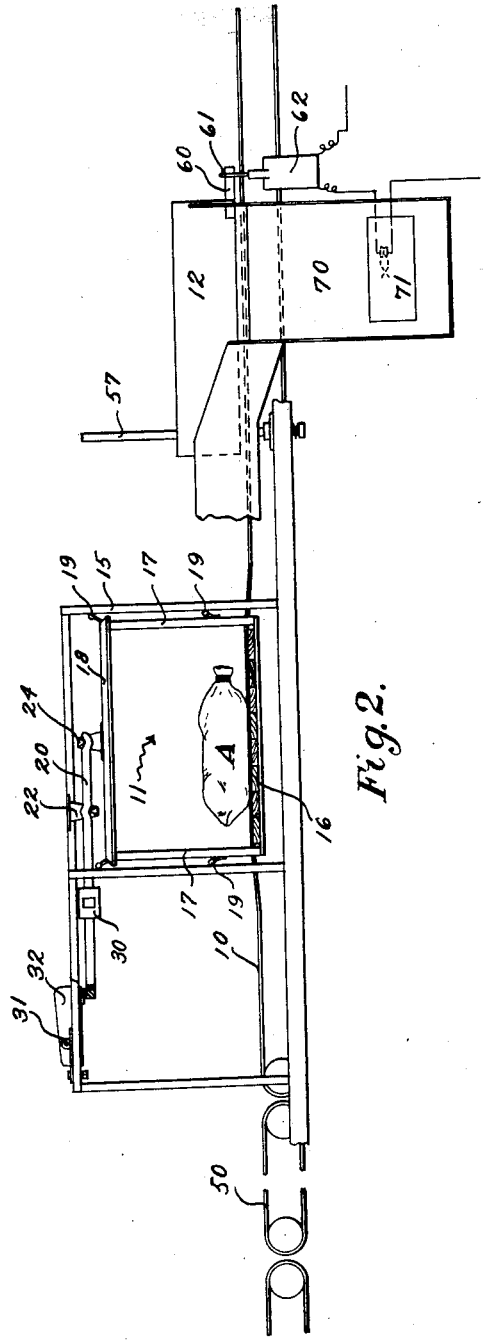
Inventor.
Albert L. Beach.
by Roberts, Cushman and Woodberg
                    Attys.

July 4, 1933.   A. L. BEACH   1,916,552
CONVEYER SYSTEM
Filed Sept. 20, 1929   3 Sheets-Sheet 2

Inventor
Albert L. Beach.
by Roberts Cushman Woodbury
Attys.

July 4, 1933.  A. L. BEACH  1,916,552

CONVEYER SYSTEM

Filed Sept. 20, 1929   3 Sheets-Sheet 3

Inventor.
Albert L. Beach.
by Roberts, Cushman and Woodberry
Attys.

Patented July 4, 1933

1,916,552

UNITED STATES PATENT OFFICE

ALBERT L. BEACH, OF SYRACUSE, NEW YORK, ASSIGNOR TO THE LAMSON COMPANY, OF SYRACUSE, NEW YORK, A CORPORATION OF MASSACHUSETTS

CONVEYER SYSTEM

Application filed September 20, 1929. Serial No. 393,928.

The object of this invention is to provide in combination with a conveyer, means for weighing articles and for handling them so that the articles are automatically accumulated and delivered to certain stations in accordance with their weights for storage or other purposes.

A further object is to provide, in combination with a conveyer, a deflector which is controlled by the weight of the articles upon the conveyer to divert articles of a certain weight from the conveyer and to allow articles of other weights to pass along unimpeded.

Another object is to provide a deflector normally extending across the conveyer and yieldable to permit the articles on the conveyer to pass and means controlled by the weight of the articles to lock the deflector in its normal position whenever an article of a predetermined weight approaches.

Thus, in an apparatus embodying this invention, articles varying in weight may be transported by a conveyer to the weighing and deflector mechanism and will thereby be automatically sorted and grouped at predetermined stations according to weights, those of one weight at one station, those of another weight at another station, etc.

One application of this invention is in connection with the loading of freight cars with bags of flour. Flour is usually packaged in bags weighing 24, 48, 96 and 140 pounds and shipments of flour are made of a quantity of bags of each size. Each freight car should contain a given number of bags of each weight. By the use of this apparatus the bags as they pass along a conveyer in a mixed order are separated and delivered, according to weight, at separate stations so that the desired number of bags of each weight are easily selected from the various stations.

This particular embodiment of the invention is shown for the purpose of illustration in the accompanying drawings in which, Fig. 1 shows in plan view a portion of a conveyer adapted to carry out this invention and, somewhat diagrammatically, the electric wiring connections applicable to the portion of the conveyer shown;

Fig. 2 is a side elevation of the conveyer shown in Fig. 1;

Figure 3:
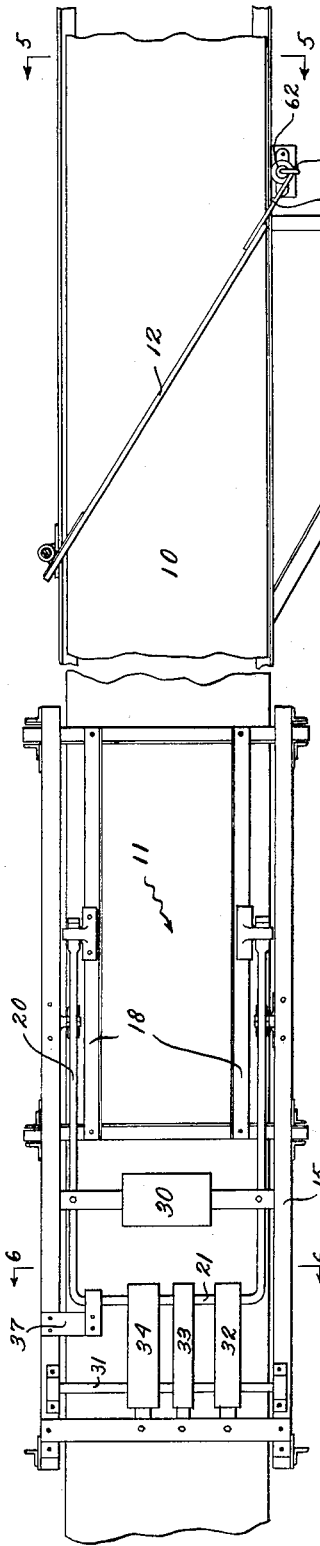
Fig. 3 is an enlarged plan view of one weighing platform and the deflector and chute associated therewith.
Figure 4:
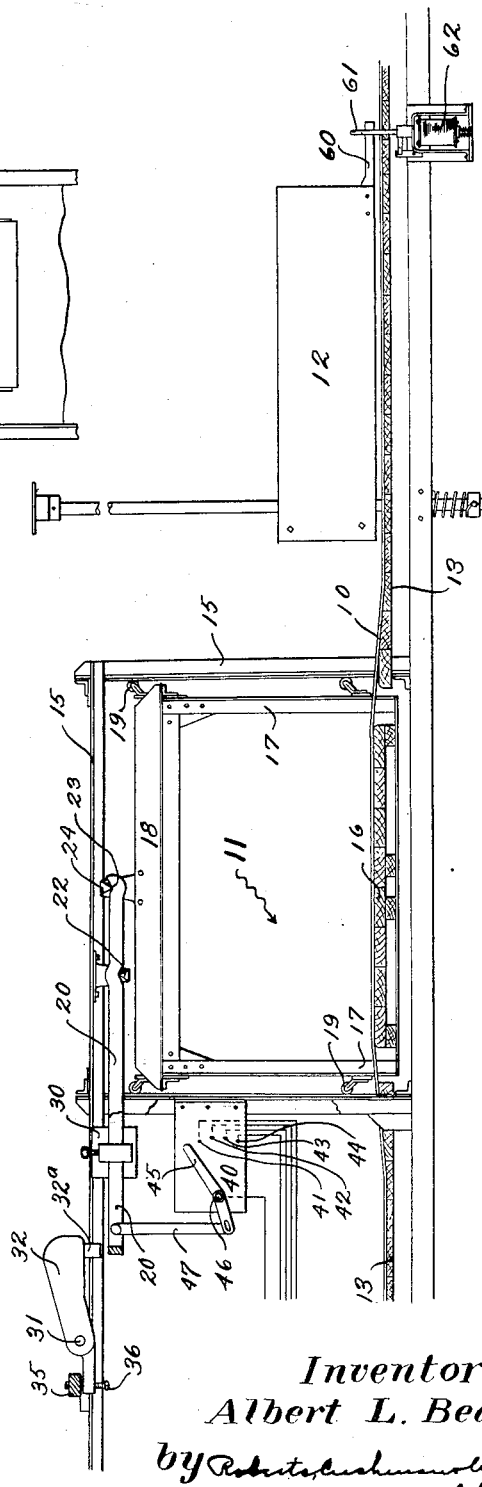
Fig. 4 is a side elevation partially in section of the weighing platform and deflector shown in Fig. 3.

In the drawings the reference numeral 10 designates a conveyer by which bags A are carried over a platform scale 11 to a deflector 12. While only one platform scale and one deflector are here shown it will of course be understood that the bags are carried by the conveyer 10 over a plurality of such scales and deflectors and that each platform is set to select bags of a certain weight to be diverted from the conveyer by the deflector in a manner differing from that about to be described merely with respect to the weight of the bags selected and diverted. The conveyer 10 passes over a support 13 which extends in sections between the scales 11.

The platform scale 11 of the weighing mechanism is supported by a frame 15 consisting of a plurality of spaced and connected uprights, and comprises a base 16, uprights 17 and side members 18 connecting the cross members. Affixed to the uprights 17 are rollers 19 which coact with the uprights of the frame 15 in order to guide the movement of the platform. The base of the platform is suspended from a pair of arms 20 connected by a cross bar 21 to form a U-shaped balance member. The arms 20 are pivotally carried upon fulcra 22 mounted upon the frame 15 and the ends of the arms are provided with depressions 23 which receive brackets 24 on the side members 18. Supported between the arms 20 is a weight 30 so selected and positioned that the scales are in equilibrium when no package is being weighed thereon.

Figure 6:
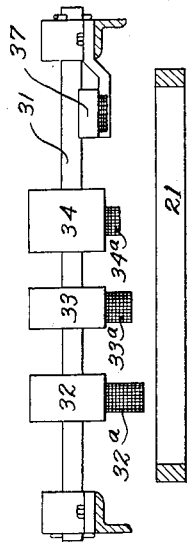
Fig. 6 is an enlarged sectional view taken along the line 6—6 of Fig. 3.
Figures 8, 9:
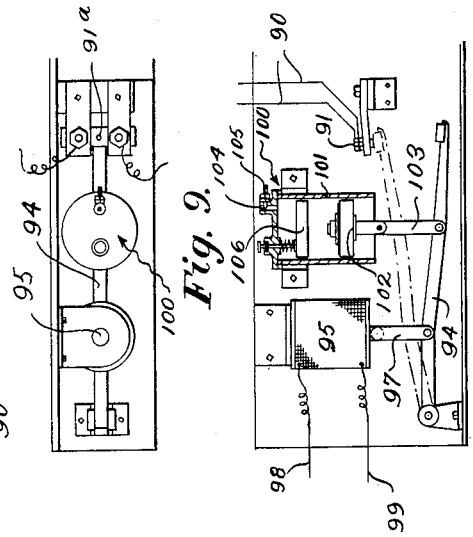
Fig. 8 is an enlarged view partly in section of a relay which prevents the locking of the deflector by other than the correct load.
Fig. 9 is a plan view of the relay shown in Fig. 8.
Figure 7:
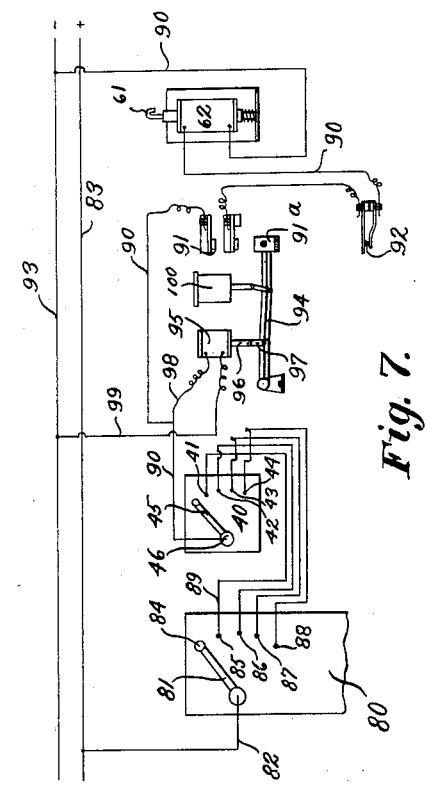
Fig. 7 is a view of the wiring diagram illustrating the manner in which the various elements are electrically controlled by the weight of the package on the platform.

In order to balance the loads on the platform 11 I provide a cross rod 31 fixed on the frame 15 upon which are pivotally mounted a plurality of weights 32, 33 and 34. These weights are in the form of arms which extend forwardly over the cross bar 21 and rearwardly beneath a fixed bar 35. Depending from the forward end of each arm is secured a block (see Fig. 6) 32ª, 33ª and 34ª respectively. The blocks vary in height for a purpose to be described later. In the rear end of each arm is mounted a set screw 36 by which the arm and its block can be readily adjusted relative to cross bar 35 and cross bar 21 respectively. A fixed stop 37 is supported upon the frame 15 to check the movement of the arms 20 under the action of the heaviest bag or article to be handled.

Mounted upon one of the uprights of the frame 15 is an electric panel 40 having a plurality of contact points 41, 42, 43, 44. An arm 45 pivotally mounted at 46 on the panel is connected through a link 47 with one of the arms 20. Obviously through the construction thus described the movement of the arms 20 under the weight of the bag A placed upon the platform scales 11 will cause the arm 45 to move downwardly into engagement with one of the contacts 41, 42, 43, 44. The arm 45 will thus close a circuit through one of the contacts depending upon the weight of the bag. This operation will be described in detail hereinbelow.

Figure 5:
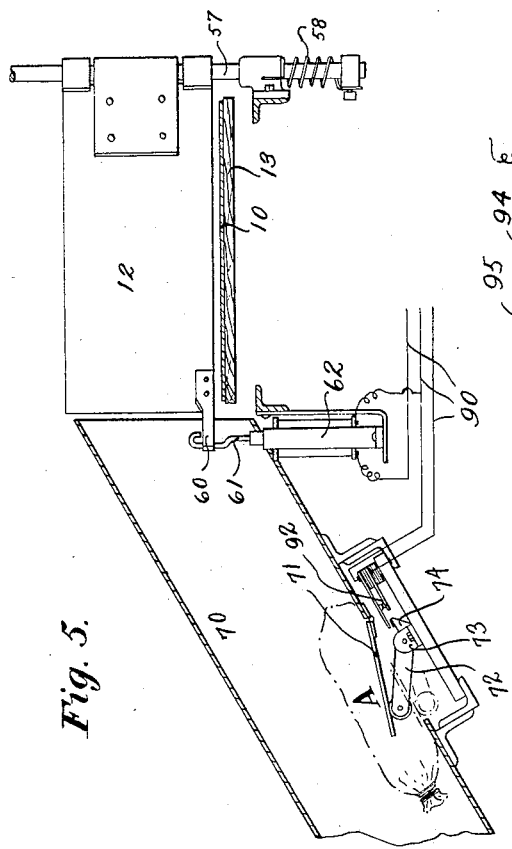
Fig. 5 is a transverse sectional view illustrating the relation of the conveyer to a discharge chute and to the package deflector.

The bag to be weighed is fed to the conveyer 10 by one or more conveyers 50 of which the one nearest the conveyer 10 preferably moves more slowly than does that conveyer thus insuring the proper spacing of the bags on the conveyer 10 and preventing the possibility of having two bags on the weighing platform 11 simultaneously. The deflector 12 is normally in the operating position shown in Figs. 1 and 3 being held in such position by spring means such for example as the tension spring 55 shown in Fig. 1 which engages an arm 56 secured to the rotatable post 57 to which the deflector 12 is fixed, or alternatively by a coil spring 58 as shown in Fig. 5. At the free end of the deflector 12 is provided a projecting finger 60 which is so positioned that it may be engaged by a latch 61 operated by a solenoid 62.

The bags diverted from the conveyer 10 by the deflector 12 enter a branch conveyer such as a chute 70 down which they descend under the force of gravity to a desired destination or station. In the floor of the chute 70 is a hinged section 71 normally held in the raised position shown in full lines Fig. 5 by an arm 72 mounted in a bracket 73. A bag passing down the chute 70 depresses the section 71 thereby raising arm 72 as shown in dotted lines and a finger 74 for a purpose to be described hereinbelow.

Each deflector 12 is adapted to divert from the conveyer all bags of a certain weight, and the weight to be diverted by each deflector is determined by a manually operated panel 80 shown at the left in Fig. 1. Upon this panel is pivotally mounted an arm 81 connected by a lead 82 with a positive line 83. The arm 81 terminates in a contact button 84 which engages any one of the four terminals 85, 86, 87 and 88 connected by leads 89 with the terminals 41, 42, 43 and 44 respectively on the panel 40. The arm 45 of the panel 40 is connected by a lead 90 through a normally opened switch 91 and a normally closed switch 92 to the solenoid 62 which controls the latch 61 and thence to the negative line 93. The normally open switch 91 comprises a pair of contact plates which are connected by a bar 91ª fixed upon and insulated from the free end of an arm 94 pivotally mounted at its other end. A solenoid 95 has a core 96 pivotally joined by a link 97 to the arm 94. The field of the solenoid is connected by a lead 98 to the lead 90 and by a lead 99 to the negative line 93. The switch 92 is opened by the finger 74 when the section 71 is depressed (see Fig. 5).

The operation of the apparatus selected as embodying the invention will now be described. Let us assume that in this apparatus used for separating bags of flour according to their weights the first deflector 12 is intended to take care of bags of minimum weight, i. e. 24 pounds, the switch arm 81 is set with its contact button 84 engaging the terminal 85. When a bag is brought by the conveyer 10 onto the platform scales 11 its weight obviously causes the platform to descend and raises the cross bar 21 connecting the arms 20. The cross bar 21 is first brought into contact with the weight arm 32 and if the bag being weighed is of the minimum weight it will be balanced by that weight and the cross bar will remain in that position. The movement of the arms 20 acts through the link 47 to cause the arm 45 on the panel 40 to come into engagement with the terminal 41. Since this terminal is supplied with current through the lead 82, arm 81, button 84, terminal 85 and lead 89 the solenoid 95 is energized by the leads 90 and 98 to close the switch 91. The current flows on through the switch 92 to the solenoid 62 causing the deflector 12 to be locked in the operative position shown in Figs. 1 and 3.

The bag being weighed then passes off the scales into contact with the locked deflector 12 by which it is diverted down the chute 70. As the bag passes over the pivoted section 71 in the bottom of the chute the arm 72 is depressed and the finger 74 raised to break the contact between the members of the switch 92 thus cutting off the supply of current to the solenoid 62 and allowing the latch 61 to rise releasing the deflector.

If the bag carried onto the platform scales 11 weighs forty-eight pounds, it is obviously not counterbalanced by the weight 32 alone and the cross member 21 continues to rise until it contacts with the weight 33. The weights 32 and 33 will be sufficient and the arm 45 on the panel 40 will be brought by the link 47 into contact with the second terminal 42. Since, however, the arm 81 on the panel 80 is set to supply current to the terminal 41 only no current will flow and the deflector 12 will remain unlocked. When the bag strikes the deflector 12 it will push it one side and continue along the conveyer to other platforms (not shown) where the operation is repeated and when the bag reaches the platform set for its weight, it will be diverted by the deflector controlled by the platform. Likewise if the bag being weighed be so heavy as to require the balancing action of the three movable weights 32. 33 and 34 or be one of the heaviest group and bring the cross bar 21 into contact with the fixed stop 37, the deflector 12 will remain unlocked and the bag will pass along the conveyer.

It will be noted that the arm 45 upon each depression, closes the circuit at the terminal 41 but that such closure is momentary except when a bag of the selected weight is placed upon the platform. Lest this fact cause difficulty a deterrent 100 is provided so that the switch 91 will be closed slowly and if the contact be momentary the circuit through the solenoid 62 will not be closed. The deterrent 100 may be of any desired form. I have chosen to provide one of the shock absorbing type comprising a cup 101, a piston 102 and a link 103 by which the piston is connected to the arm 94. An outlet 104 from the cup 101 may be regulated by a set screw 105 and a spring advanced plate 106 provided against which the piston head bears.

Obviously the platform 11 here shown may be selected to cause the deflection of any weight of bag by simply setting the arm 81 of the panel 80 in contact with the proper terminal. While only one combination of platform scales, deflector and chute is shown other combinations will be provided through which the conveyor will transport the packages.

Apparatus embodying this invention, one form of which has been described above and shown in the drawings will, as there pointed out, function upon packages transported by a conveyor to separate them according to their weight. Moreover, the various deflectors will act in conjunction with the scales to divert only packages of a certain weight and will allow all other packages to pass freely.

While one embodiment only of this invention has been shown and described, I am not limited to the particular elements, features or functions thereof since obviously other embodiments could be made without departing from the spirit and scope of the invention as set forth in the following claims. Hence, the various terms here used "conveyer", "weighing mechanism", "deflector", "latch", "solenoid", for example, are not confined in their application to the particular form of such elements here shown. Moreover, one essential feature of this invention is the control of the deflector by the weight of the various articles and while certain specific weights of articles have been set forth, it will be understood that the particular weight of the articles is not so important as the relation between the articles evidenced by their weights.

I claim:

1. A conveyer system of that type in which articles are automatically sorted into classes during transit along a predetermined path said system comprising a scale beam and a freely suspended and counterbalanced scale platform, means for delivering the articles to and removing them from the scale platform, a plurality of weights with which an element of the scale beam comes into contact successively as the scale platform descends in response to load, two groups of electrical contacts, conductors connecting corresponding contacts of each group, a movable circuit closing arm adapted to engage the contacts of one group, means connecting said arm with the scale beam so that as the scale platform descends said arm will successively engage the contacts of its group, a manually actuated selector arm engageable with any of the contacts of the other group, an electrical circuit including said circuit closing arm, switch arm and a selected one of said conductors, means operative upon closure of said circuit through any of said conductors for diverting an article in transit from its normal path, and means operative to delay closure of said circuit as the circuit closing arm momentarily engages any of its group of contacts in passing from one contact to another.

2. A conveyer system of that type in which articles are automatically assorted into classes during transit along a predetermined path, said system comprising a deflector, an electrical circuit including electrically actuated means for locking the deflector in operative position whereby to divert articles of any selected class from said path, and means for closing said circuit including mutually cooperating devices, one of said devices being a manually actuable selector, and the other device comprising a switch arm which moves to different distances from an initial position in response to different weights of article, a series of contacts with which said arm successively engages as it moves from initial position, a solenoid adapted to be energized when said arm engages any one of said contacts, a switch for closing said deflector locking circuit when the solenoid is energized, and means for delaying closure of said switch when the solenoid is energized.

3. A conveyer system of that type in which articles are automatically assorted into classes during transit along a predetermined path, said system comprising a deflector, an electrical circuit including electrically actuated means for locking the deflector in operative position whereby to divert articles of any selected class from said path, and means for closing said circuit including mutually cooperating devices, one of said devices being a manually actuable selector, and the other device comprising a switch arm which moves to different distances from an initial position in response to different weights of article, a series of contacts with which said arm successively engages as it moves from initial position, a solenoid adapted to be energized when said arm engages any one of said contacts, a switch for closing said circuit when the solenoid is energized, and a dash-pot device connected to said switch to delay closure thereof when the solenoid is energized.

Signed by me at Syracuse, New York, this 16th day of September, 1929.

ALBERT L. BEACH.